United States Patent

Shah et al.

[11] Patent Number: 5,933,435
[45] Date of Patent: Aug. 3, 1999

[54] OPTIMIZED METHOD OF DATA COMMUNICATION AND SYSTEM EMPLOYING SAME

[75] Inventors: Vinay Velji Shah, Eastleigh; Ian David Judd, Winchester; Reginald Beer, Eastleigh, all of United Kingdom

[73] Assignee: International Business Machines Corporation, Armonk, N.Y.

[21] Appl. No.: 07/917,098
[22] PCT Filed: Feb. 19, 1991
[86] PCT No.: PCT/GB91/00258
   § 371 Date: Sep. 25, 1992
   § 102(e) Date: Sep. 25, 1992
[87] PCT Pub. No.: WO92/10894
   PCT Pub. Date: Jun. 25, 1992

[30] Foreign Application Priority Data

Dec. 4, 1990 [GB] United Kingdom .................... 9026336

[51] Int. Cl.[6] ........................................................ H04L 1/18
[52] U.S. Cl. ............................................. 371/33; 370/232
[58] Field of Search ................................. 371/32, 33, 30; 370/37, 60, 82, 94.1, 94.2, 105.1, 229, 232, 235

[56] References Cited

U.S. PATENT DOCUMENTS

| | | |
|---|---|---|
| 3,979,719 | 9/1976 | Tooley et al. .................... 340/146.1 |
| 4,352,103 | 9/1982 | Slater ................................. 371/33 |
| 4,554,541 | 11/1985 | Bielkevicius et al. .......... 340/825.68 |
| 4,803,685 | 2/1989 | Oget ................................... 371/33 |
| 4,914,654 | 4/1990 | Matsuda et al. ................. 370/94.1 |
| 5,027,349 | 6/1991 | Thorne .............................. 370/85.1 |
| 5,027,358 | 6/1991 | O'Dell et al. ..................... 371/33 |
| 5,084,871 | 1/1992 | Carn et al. ........................ 370/94.1 |
| 5,265,103 | 11/1993 | Brightwell ......................... 371/32 |

FOREIGN PATENT DOCUMENTS

| | | |
|---|---|---|
| 0186343 | 7/1986 | European Pat. Off. .......... H04L 1/16 |
| 0390015 | 10/1990 | European Pat. Off. ........ H04L 12/56 |
| 0397138 | 11/1990 | European Pat. Off. . |

*Primary Examiner*—Albert DeCady
*Attorney, Agent, or Firm*—Matthew J. Bussan

[57] ABSTRACT

Described is a system and method of communicating between first and second nodes connected by a serial link wherein the data is transmitted between the nodes in the form of packets made up of multiple bit frames. Each packet that is correctly received by the second node is acknowledged by means of a pair of multibit frames. These frames may be interleaved among the frames making up any outgoing data packet that is being transmitted by the second node. The technique employed provides unambiguous acknowledgment of each data packet and if a data packet is received incorrectly, the packet is available in a buffer in the first node for resending.

12 Claims, 11 Drawing Sheets

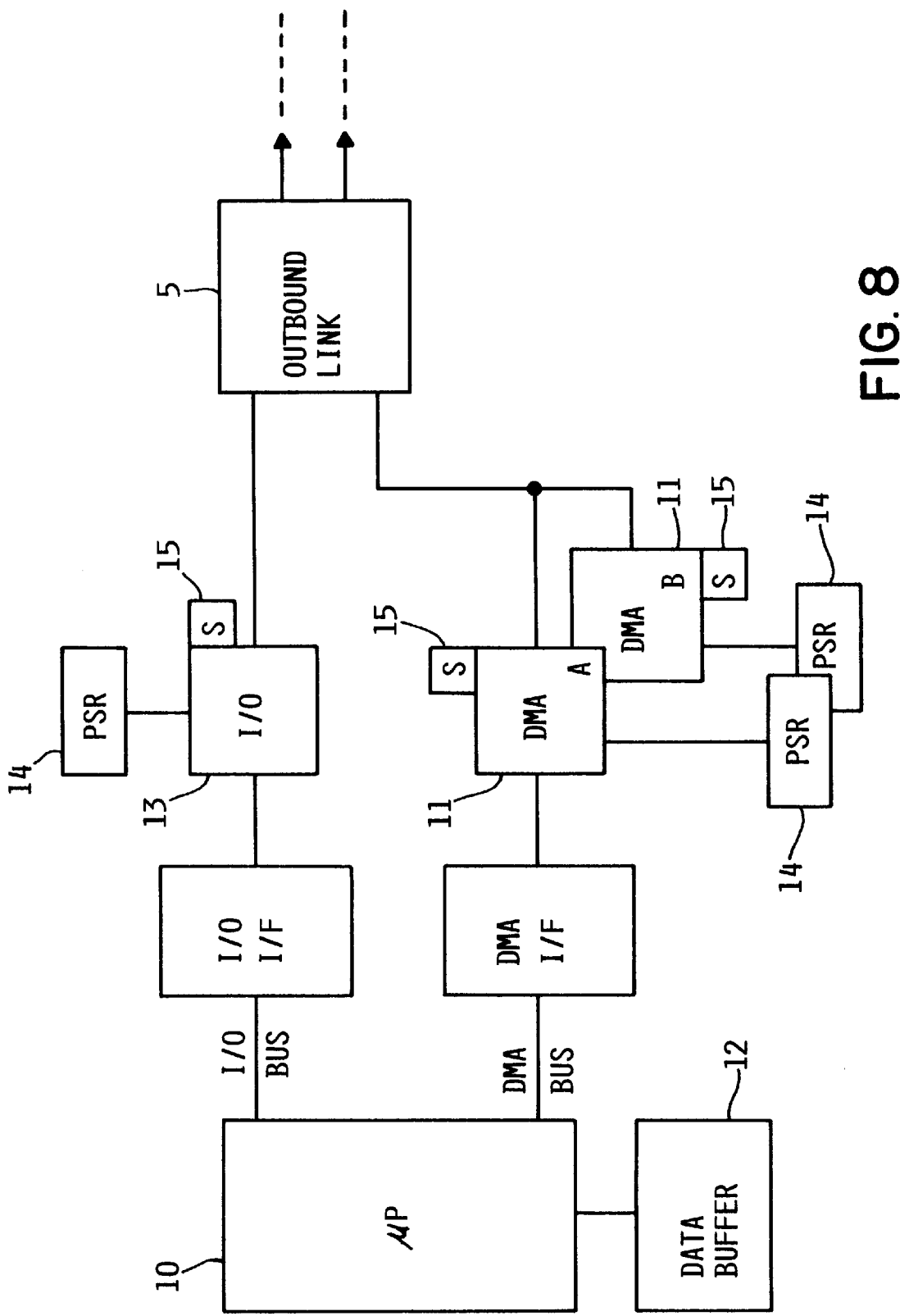

1

OPTIMIZED METHOD OF DATA COMMUNICATION AND SYSTEM EMPLOYING SAME

TECHNICAL FIELD OF THE INVENTION

This invention relates to the field of communication protocols and more particularly to an optimised method and system for transmitting data packets between nodes in a digital system.

BACKGROUND OF THE INVENTION

Data communication systems and the elements making up data communication systems involve the electronic transmission of data over a link from one node (e.g computer or terminal) of the system to another. To ensure communication in an orderly fashion over the data link, a uniform method of sending and receiving information is required. This uniformity is achieved by means of a protocol (set of rules) used for the management of a data link in the communication system. Protocols are used to perform such functions as establishing the conversation between two nodes in the communication system, identifying the sender and receiver, acknowledging received information and node initialisation. The exact procedure and function performed depends on the protocol used. Data link protocols may be classified in two categories; bit oriented protocols (BOP) and byte oriented protocols.

Prior bit oriented protocols include the Synchronous Data Link Control (SDLC) protocol which was introduced by IBM in 1973 and the High Level Data Link Control (HDLC) protocol. All communications in a BOP system are in the form of frames of uniform format which comprise a number of fields each having a definite location and precise meaning. In HDLC a frame commonly starts with an eight bit flag sequence which is followed by ADDRESS and CONTROL fields after which may follow an INFORMATION field (depending on the function of the frame). The INFORMATION field is followed by a FRAME CHECK SEQUENCE field and the end of the frame is delimited by another flag sequence. The Address and Control fields in HDLC each comprise a single octet of bits. The information field may contain a variable number of bits, in the form of an integral number of octets, up to a predefined limit. The FCS field commonly comprises a pair of octets.

In HDLC, the CONTROL field defines the function of the frame. There are three basic types: Information, Supervisory and Unnumbered which are referred to as I-frames, S-frames and U-frames. The I-frame is used to provide for information transfer across the link and contains an INFORMATION field. The S-frame is used to perform supervisory functions on the link and may be used to acknowledge I-frames, or to request retransmission of frames. The U-frame is used particularly in error recovery.

HDLC is often employed in systems wherein data communication is over relatively long distances where there will be a number of data frames on the link at any one time. The method of acknowledgement that data has been received has to be capable of detecting the incorrect transmission of any one of these data frames. An implied acknowledgement technique is used which enables frame acknowledgement information to be included within an I-frame. This is accomplished by assigning identification numbers, called sequence numbers, to received and transmitted frames. These numbers contain information pertaining to the number of frames transmitted and received by the individual node. By checking these numbers, the node can compare the number of received frames with the number of transmitted frames and take the appropriate error recovery action if a discrepancy exists. Although the packet sequence numbers used in the described implied acknowledgment technique may be included within an I-frame, if information frames are not being sent by the node receiving the data frame to be acknowledged, then it is necessary to include the sequence number information in a separate S-frame. Details of one subset of HDLC can be found in 'X25 explained' by R J Deasington, published by Ellis Horwood Limited.

Thus in bit oriented protocols, it is not necessary to operate in a send and hold mode whereby the transmitting node has to wait for acknowledgement that a frame has been received before transmitting a subsequent frame. Thus Bit oriented protocols are operable in full duplex mode (two way simultaneous communication). BOP systems may of course be operated in half duplex mode (two way alternate communication) though in half duplex mode, the advantages inherent in the protocol are not used.

One type of byte oriented protocol is BISYNC, in which information is transmitted in blocks consisting of one or two sync characters, an address, control characters, an information field and an error checking code. Special block control characters are used to manage the flow of information over the link. In BISYNC it is necessary to ensure that the information field does not contain a bit sequence which corresponds to one of the control characters otherwise that bit sequence will be incorrectly interpreted by the system as a control character. BISYNC is an example of a send and hold protocol in which the transmitting node has to receive acknowledgement of a first block of data before it can begin sending a second block. Accordingly, BISYNC in its basic form is not able to operate in full duplex mode.

DISCLOSURE OF THE INVENTION

Although numerous methods of communication have been proposed for use in a variety of different applications, there is a need for an optimised method of communication between nodes which are connected by a relatively short distance link.

Viewed from one aspect, the invention accordingly provides a method of communicating between first and second nodes connected by a serial link, the method comprising; transmitting data between said nodes in the form of packets comprising a plurality of predefined fields, each field consisting of one or more multibit data frames and controlling the flow of the data by means of multiple bit control frames distinguishable from the data frames, the control frames being transmissible independently of the data packets.

A typical packet employed in the method of the present invention will comprise an address field and a control field each consisting of one data frame, an optional information field consisting of a variable number of data frames, and a CRC field consisting of two data frames. The bits in the frames of the address and control fields each have a predefined meaning.

It is necessary at this stage to clarify the meaning of the various terms used in the present invention and their relation to the terminology employed in the description of the prior art. The term 'packet' as used in the present invention is essentially equivalent to the term 'frame' as used in the prior art description of the HDLC protocol. In addition the term 'frame' used in the present invention is essentially equivalent to the term 'octet' as used in the description of HDLC.

The control frames of the present invention are of a predefined format which is chosen in order that a node receiving a control frame is able to differentiate the control frame from the data frame of a packet. Preferably, during full duplex transmission between first and second nodes, said control frames sent by the second node are interleaved with data packets also being sent by the second node. Thus in full duplex mode, wherein packets of data are being transmitted over the link by both nodes, the responses in the form of control frames are interleaved within the outgoing packets.

The use of control frames as opposed to complete packets (e.g. the use of S-frames in the implied acknowledgement technique of HDLC) also has the secondary advantage of permitting continuous (back to back) full duplex operation with only 2 transmit and 2 receive buffers. No extra buffering is required to receive the control frames.

Thus in the present invention, control of the flow of data over the link is managed by control frames. Pacing of the link ie ensuring availability of data buffers before data is transmitted is governed by RR frames which are sent by the destination node to tell the source node that it is ready to receive data. ACK frames are sent by the destination node to acknowledge receipt of a data packet. RR and ACK frames are interleaved in the data packets during full duplex transmission of data. This interleaving minimises latency and the use of control frames as opposed to complete packets makes efficient use of the available bandwidth of the link.

Since the responses consist of control frames which are of a predefined format, the receiving node can recognise control frames interleaved with the data frame of a packet and therefore can separate them from the frames that make up a packet.

Preferably the method further comprises transmitting first and second packets of data from the first node to the second node wherein transmission of second data packet cannot be completed before an acknowledgement signal associated with the first packet is received by the first node from the second node.

In this way the protocol can associate each acknowledgement with its corresponding packet unambiguously. This makes the protocol tolerant of propagation delays, transmission speed and packet length variations.

Preferably the control frames are transmitted in pairs. If used singly it is possible that a control frame might inadvertently be generated from another type of frame by a transmission error over the link. Use of control frames in pairs provides a safety margin to avoid such a potential problem. In a preferred method, a node only acts on a response when it has received both frames of the pair without any other intervening frames. For example in a preferred method, the transmitting node will complete transmission of a second data packet only when it has received both frames of the first packet acknowledgement control frame.

In the preferred method, when the transmitting node is in the process of sending a second packet and is waiting for an acknowledgement that the first packet has been correctly received, NUL frames are preferably inserted into the second packet until the acknowledgement frame is received, after which a FLAG frame defining the end of the packet is transmitted. The use of the NUL frame to pad before the end of a packet allows the protocol to work over any distance (although the effective data rate may be reduced when operating with short packet sizes over long distances).

The protocol is optimised for point to point communication over short distances using a medium that is relatively error free. This permits economical hardware implementation, with low overheads. A minimum of 1 receive buffer and no transmit buffer is required for each node. However, in order to achieve full duplex operation more buffers are required, typically 2 transmit and 2 receive buffers per node.

Viewed from another aspect the invention provides a data communication system comprising a first node connected to a second node by means of a serial link, means in the first node for transmitting data over the serial link to the second node, the data being in the form of packets comprising a plurality of predefined fields, each field consisting of one or more multibit data frames, and means for controlling the flow of data between the nodes employing multiple bit control frames distinguishable from the data frames, said control frames being transmissible independently of the data packets.

The claimed invention will find utility in a number of different systems wherein data is transferred between nodes e.g. between a computer and peripheral devices attached thereto e.g. disk drives. One computer may be attached by a plurality of links to a plurality of disk drives. The method claimed is especially effective in transferring data at high rates between nodes which are separated by a relatively short distance (e.g. tens of meters in the case of a twisted wire pair link).

A preferred embodiment of the invention will now be described by way of example only with reference to the accompanying drawings.

BRIEF DESCRIPTION OF THE DRAWINGS

FIG. 8 shows the link hardware connected to a data buffer via a microprocessor.

DETAILED DESCRIPTION OF THE INVENTION

A glossary of terms used in the following description can be found in attached Table I.

Figure 1:
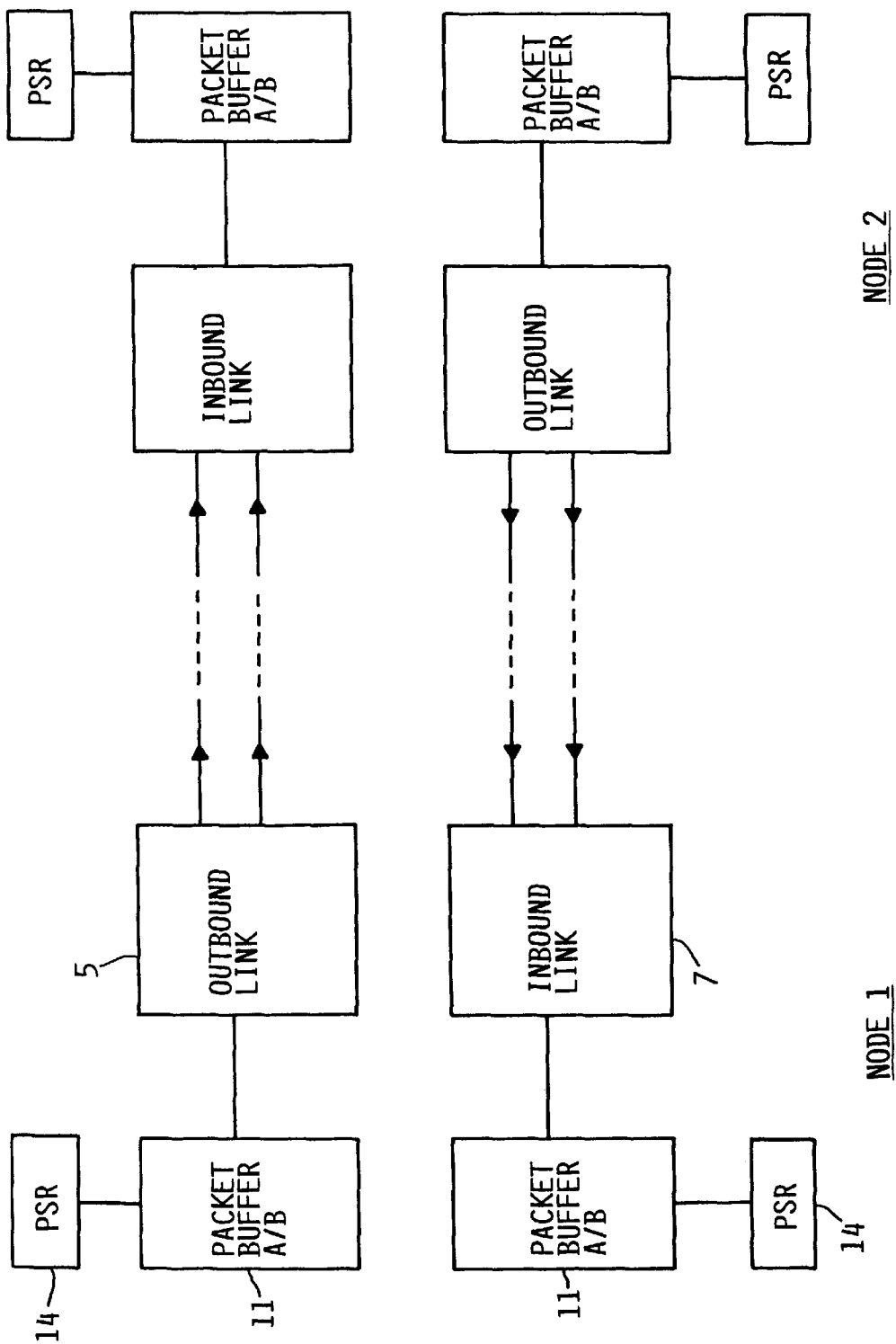
FIG. 1 shows a schematic diagram of the main components of a node to node data link configuration according to the present invention.

FIG. 1 shows two nodes (node 1 and node 2) each of which has an associated inbound 7 and outbound 5 link. Each link controls the transmission or receipt of data to and from the connected node. Data to be transmitted or that has been received is held in outbound and inbound packet buffers 11 respectively. Each packet buffer has associated with it a packet status register 14 in which some of the information required for the transmission or receipt of data is held.

Data is transmitted between the nodes in the form of packets of a predefined format. The control of the flow of the data packets is managed by means of control frames. Details of the data packets and control frames will now be described.

There are two basic types of frame employed: DATA frames and PROTOCOL frames. In the embodiment described herein there are 256 data frames and 4 protocol frames. The protocol frames are used to delimit packets and to provide flow control.

Figure 5:
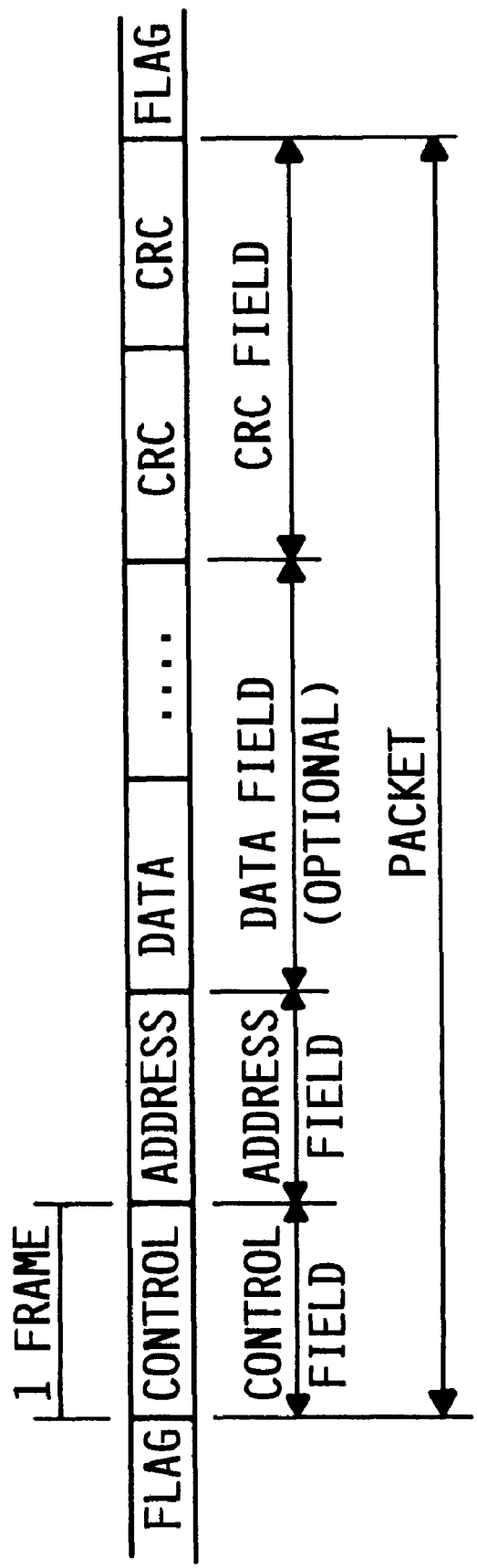
FIG. 5 shows the format of a data packet by means of which data is transmitted.

FIG. 5 shows the packet format which is used for the transmission of data over the link. A packet consists of a sequence of at least 4 data frames that is delimited at both ends by a FLAG frame (described below). A packet is divided into a sequence of 3 or 4 fields as follows:

Control field. (1 frame, always present.)
Address field. (1 frame, always present.)
Data field. (Variable length, optionally present.)
CRC field. (2 frames, always present.)

The shortest possible packet, with no data field, contains 4 data frames. If a node receives a packet containing less than 4 frames then it will indicate a protocol error.

CONTROL FIELD: The control field is the first data frame following a FLAG. When received by the receiving node and after decoding (more detail of which is given later), the resulting byte is interpreted as follows:

| User defined | Link reset | Total reset | Packet sequence number |
|---|---|---|---|
| Bit 0      3 | 4 | 5 | 6      7 |

User Defined: these are spare bits and may be used for any purpose that the using system requires.

Link Reset & Total Reset: These bits are used in the error recovery procedure which is associated with the communication method described herein. Some details of the error recovery procedure are described in the present application but more specific detail of the associated error recovery procedure can be found in a concurrently filed application entitled 'Method of Error Recovery' filed in the same name as the present application.

Packet Sequence No: These 2 bits are used to protect against lost or duplicate packets. They are incremented modulo 4 by the transmitter in each successive packet and checked by the receiver.

ADDRESS FIELD: This is a single data frame that immediately follows the control field. It normally contains the encoded destination address of the packet within the remote node.

DATA FIELD: The data field is optional. If present it consists of a variable number of data frames that follow the address field. The content of the data field is controlled entirely by the application and it is of no relevance to the architecture of the link. The maximum length of the data field is implementation dependent and it depends on (i) the size of the available packet buffers, (ii) the sustained data rate that is required and (iii) the acceptable error rate given the system environment and the defined CRC polynomial.

Some implementations may have further restrictions, eg. the length of the data field must be an even number of frames. In such an implementation, if a node receives a packet with an incorrect length for the data field then it rejects the packet.

CRC FIELD: The CRC field consists of 2 data frames that immediately precede the trailing FLAG. It is used to check the control, address and data fields. The destination does not regard any of the fields as valid until the CRC field has been received and checked by the receiver.

For each packet of data, the CRC field is calculated by the outbound CRC generator, in a 16 bit register, using the following polynomial:

$$X^{16}+X^{15}+X^{2}+1$$

The CRC register is preset to all ones at the start of each packet.

The inbound CRC accumulator in the inbound serial link decodes the CRC field and checks it using the same polynomial as described above. The CRC register is preset to all ones at the start of each packet and accumulated over the control, address and data fields. At the end of accumulation, provided that the incoming packet was received without error, the CRC register in the inbound accumulator should contain all zeros.

One type of protocol frame defined in the communication method of the present invention is a FLAG frame which is used to delimit a packet. The transition from a FLAG frame to a data frame marks the start of packet, and the transition from a data frame to a FLAG frame marks the end of a packet. These will be referred to later in the description as the leading FLAG and the trailing FLAG respectively.

To minimise overheads a trailing FLAG can also be the leading FLAG of the next packet. Thus consecutive packets are separated by a minimum of one FLAG. The bit pattern for the FLAG frame has been chosen such that it does not occur at any bit position in an arbitrary sequence of any other valid frames. An example bit pattern for this and other types of protocol frame is described below. The FLAG frame also serves the additional purpose of providing frame synchronisation. In addition, FLAG frames are sent when the link is idle in order to maintain synchronisation at the receiving end of the link.

The communication method and system of the present invention provide the means for transmitting data in the form of the above described packets from a source to a destination node. To implement the necessary flow control, the destination sends the source two responses for each packet:

ACKNOWLEDGEMENT A pair of consecutive ACK protocol frames
RECEIVER READY A pair of consecutive RR protocol frames.

The control frames are preferably used in pairs to protect the responses from being manufactured by transmission errors. A node only acts on a response when it has received both frames of the pair without any other intervening frames.

In full duplex operation a node may wish to send a response for a received packet whilst it is in the middle of transmitting another packet. In this case the transmitter gives priority to the response and interleaves it within the packet. This scheme minimises latency and it allows the maximum link thoughput to be achieved with only 2 packet buffers in each transmitter and each receiver.

Since responses consist of control frames the receiver can easily separate them from the data frames that make up a packet. The CRC field for a packet does NOT include any interleaved response frames.

ACKNOWLEDGEMENTS: The communication method of the present invention requires a node to acknowledge every valid received packet. A packet is valid if it does not contain any of the 'receiver errors' listed in the link status byte. The destination transmits an ACK response when it receives a valid packet. When the source receives the ACK response, the portion of the outbound data buffer which contained the information making up the acknowledged packet may be cleared ready for the input of new data to be transmitted.

Figure 6:
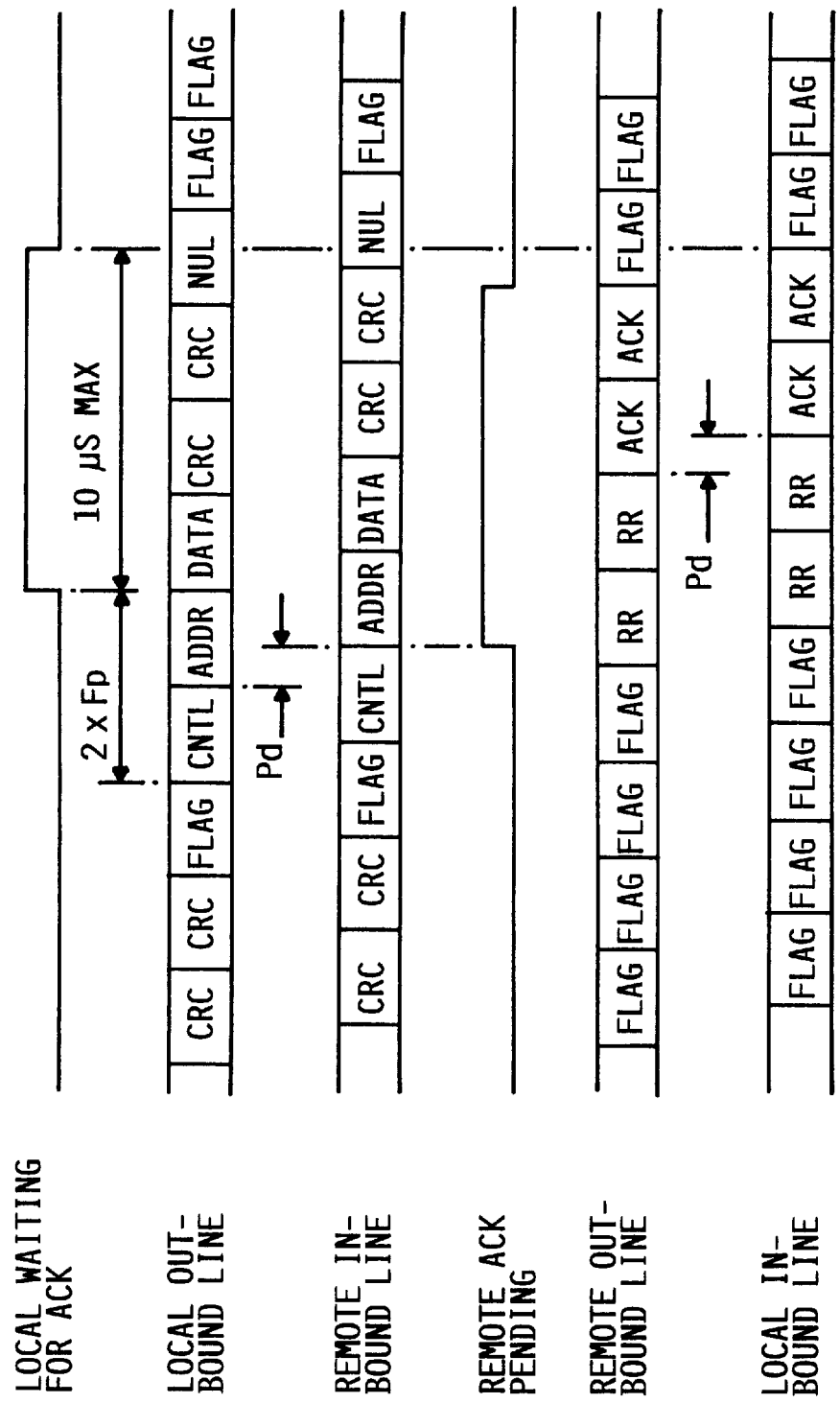
FIG. 6 shows the timing of ACK responses in a communication method according to the present invention

Each node has two associated conditions, 'waiting for ACK' and 'ACK pending'. How these conditions control acknowledgements is next described with reference to FIG. 6:

1. When a node enters the 'ready' state (the possible states of the link are described in more detail below) it clears 'waiting for ACK' and 'ACK pending'.

2. A node sets 'waiting for ACK' 2 frame periods after it finishes transmitting the trailing FLAG of any packet. A node resets 'waiting for ACK' when it receives an ACK response. The corresponding outbound packet buffer may then be deallocated and filled by another packet.

If a node does not receive the first ACK of the response within a predefined time (e.g. 10 micro seconds) after setting 'waiting for ACK' for a packet then it recognises an ACK time out.

If a node is still 'waiting for ACK' when it finishes transmitting the CRC field of the next packet then it does not transmit the trailing FLAG. Instead it sends NUL frames until either the ACK response is received or an ACK time out occurs. If an ACK time out does occur in this state then the node must send an illegal frame followed by FLAG's. The illegal frame aborts the packet and ensures that it is rejected by the remote node.

This protocol guarantees that the transmitter can always associate each ACK response unambiguously with the corresponding packet independently of propagation delays, the transmission speed and the packet length.

If a node receives an ACK control frame when it is not 'waiting for ACK', or it receives only a single ACK frame, then it recognises a protocol error.

3. A node sets 'ACK pending' immediately when it receives the trailing FLAG of a valid packet when the node is in the 'ready' state.

4. When 'ACK pending' is set the node must transmit an ACK response as soon as possible. However if an RR response is in progress then it must be completed first. 'ACK pending' is reset when the ACK response has been transmitted.

PACING

Pacing ensures that the transmitter does not overrun the available buffers in the receiver. The unit of pacing is a packet. The method of communication of the present invention requires a receiver to have only one buffer, although at least 2 buffers are generally required to achieve continuous (full duplex) operation of the link.

Each node has two conditions that control pacing, 'waiting for RR' and 'RR pending':

1. When a node enters the 'ready' state it sets 'waiting for RR' and 'RR pending'. Consequently it will send an RR response immediately and it will not send any packets until it receives an RR response.

2. A node may only start to send a packet when either of the following conditions is satisfied:
  a) The node is in the 'ready' state and it is not 'waiting for RR'.
  b) The node is in the 'check' state and the packet control field will specify Link Reset or Total Reset.

'Waiting for RR' is set when a node transmits the control field of any packet and reset when it receives an RR response.

3. When all of the following conditions are satisfied a node transmits an RR response immediately after the current frame:
  a) The node is in the 'ready' state and 'RR pending' is set.
  b) At least one inbound buffer is available to receive a packet in addition to the packet currently being received, if any.
  c) The node is not currently transmitting an ACK response and 'ACK pending' is not set.

'RR pending' is set when a node receives the control field of any packet, including invalid packets. It is reset when the node transmits an RR response.

PACKET SEQUENCE NUMBERS are employed to protect against packets being lost or duplicated by a transmission error. For example, if a FLAG is corrupted then two packets may be merged into one. A packet could be duplicated if a transmission error corrupts an ACK response. To guard against this the Link ERP needs to know whether the corresponding packet has actually been received by the destination.

The control field of each packet contains a 2 bit Packet Sequence Number (PSN). In normal operation the PSN increments modulo 4 in each successive packet.

Each node maintains a 2 bit Transmit Sequence Number (TSN) and it copies this into the PSN of each packet sent. The TSN is reset to '00' in the 'disabled' state and it is incremented modulo 4 for each packet transmitted, regardless of any response received.

Each node also maintains a 2 bit Receive Sequence Number (RSN). This is reset to '00'B in the 'disabled state' and it is incremented modulo 4 only when the receiver accepts a packet, ie. when it returns an ACK response. However the RSN must not be incremented by Link Resets. When a packet is received the hardware checks the PSN against the RSN as follows:

If PSN=RSN then the sequence is correct and the receiver has received the packet it was expecting. Providing that there is no other error then the packet is accepted and an ACK response is returned.

If PSN is not equal to RSN and the packet does not specify Link Reset or Total Reset then one or more packets have been lost. The current packet is not acknowledged and the node recognises a sequence error.

NB. The receiver ignores the PSN in a Link Reset or Total Reset packet.

NUL FRAMES

The node transmitter is permitted to insert NUL protocol frames within a packet anywhere after the first data frame. The receiver ignores NUL frames by discarding them. NUL frames are not included in the calculation of the CRC field. This facility is useful in the following cases:

(i) If the transmitter has started to send a packet but the data needed to complete the packet is temporarily unavailable.

(ii) If the transmitter is still waiting for an ACK response when it is ready to send the trailing FLAG of the next packet.

In order to guarantee frame synchronisation NUL's are not permitted when the link is idle. If the receiver detects a NUL frame and it has not decoded a data frame since it received the last FLAG then it indicates a protocol error.

Packets may be aborted if a node detects an internal hardware error while it is transmitting a packet. This is achieved by inserting an illegal frame anywhere before the trailing FLAG.

Figure 7A:
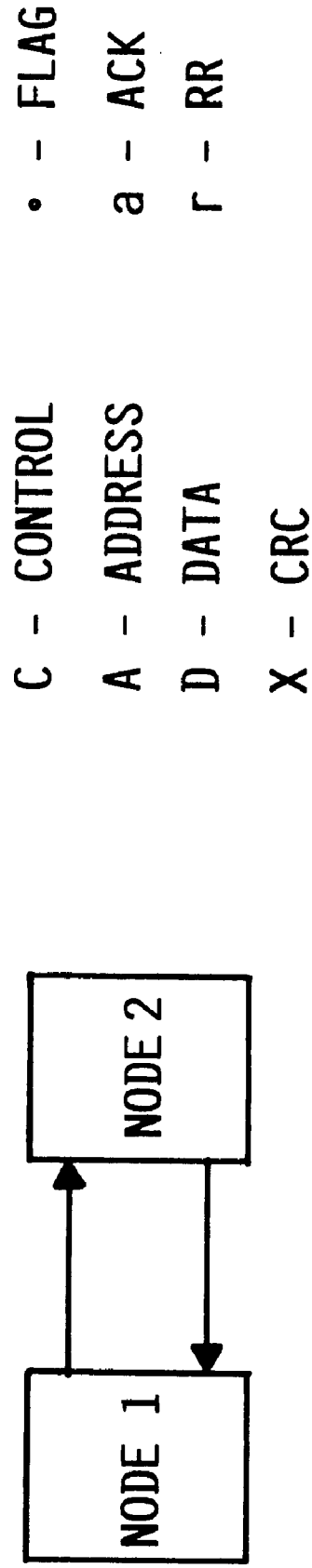
FIGS. 7a, 7b and 7c show examples of half duplex and full duplex communication between first and second nodes according to the present invention.

The transmission of packets of data and the responses to these packets will next be described with reference to FIG. 7. The examples described assume that each node has a pair of transmit buffers and a pair of receive buffers.

Figure 7B:
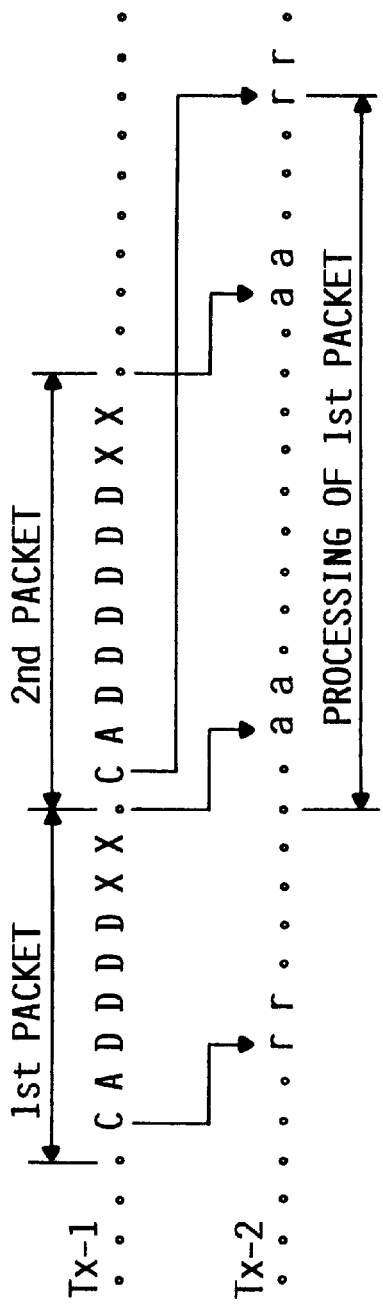

FIG. 7b shows a half duplex transfer with node 1 acting as a source and node 2 as the destination. The initial exchange of RR responses which takes place when the link is powered on has already taken place.

Node 1 begins to send the first packet to node 2. When the control field of the packet has been transmitted, 'Waiting for RR' is set. Node 2 sends an RR response as soon as it detects the start of the packet since it has A/B receive buffers i.e. a second empty buffer is available to receive a packet in addition to the first packet currently being received. This resets 'waiting for RR' in node 1 so that it can start sending packet 2 immediately after the trailing flag of the first packet. When the transmission of packet 1 is complete, node 1 sets 'ACK pending' which is reset on receipt of the ACK response from node 2 sent immediately when it detects the trailing FLAG of packet 1. As described Node 1 is able to send the second packet after completing transmission of the first packet. When Node 2 receives the trailing flag of the second packet and assuming the packet has been correctly received, it sends a pair of ACK frames to Node 1. A period of time after transmitting the ACK frames for the second packet Node 2 is ready to receive more data and accordingly transmits a pair of RR frames. The delay in sending out the second pair of RR frames is the time taken to process the first packet ie the time taken for the data buffer containing the first packet to be freed for further use.

Figure 7C:
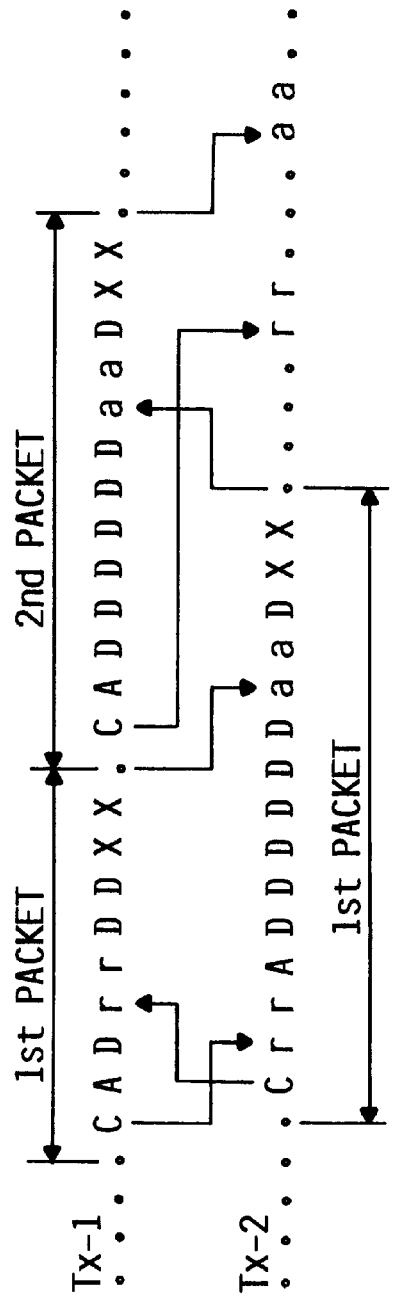

FIG. 7c shows, in simplified form, a full duplex transfer with node 1 acting as a source of 2 packets and node 1 acting as a source of 1 packet.

The initial exchange of RR frames has already taken place and both nodes are ready to receive packets of data. Node 1 begins sending the first packet one time period before node 2 begins sending out its first packet. When node 2 receives the first frame of the first packet from node 1, it sends a pair off RR frames indicating that there is buffer space available for a second packet from node 1. Because node 2 has begun sending its first packet, the pair of RR frames is interleaved between the control and address frames of packet 1. When it has sent the RR frames node 2 continues transmitting its first packet.

In the same way, when node 1 receives the first frame of packet 1 from node 2, it transmits a pair of RR frames, which are interleaved between data frames of its first packet. Both nodes then continue transmitting their first packet. When node 2 receives the end flag frame of the node 1 first packet, it transmits a pair of ACK frames interleaved between two outgoing data frames indicating that it has received packet 1 correctly. After completing transmission of the first packet, node 1 is able to immediately start sending the second packet (node 2 had earlier sent an RR response indicating that buffer space was available for a second packet). On receiving the trailing flag of the first packet from node 1, node 2 interrupts transmission of its second packet to send out a pair of ACK frames.

When node 2 receives the control frame of the node 1 second packet, it does not have the buffer space available to receive a third packet and is therefore unable to send an immediate RR response to the first node. Therefore, node 2 sets 'RR pending'. When the Node 2 buffer containing the first packet from node 1 has been processed by the application and the data has been removed, node 2 sends an RR response. When node 2 receives the trailing flag of the node 1 second packet, it sends the usual ACK response. Transmission and acknowledgement of all three packets is now complete and as there is no more data to be transmitted, both nodes continue with the continuous transmission of FLAGS.

Each node must provide at least one buffer for received packets. The buffer must be large enough to accommodate the longest packet that is defined. The buffer is needed to allow the CRC field to be verified before the receiver transfers the data field to the application or acts on the control and address fields. Since the unit of pacing is a packet the buffer is also necessary to prevent overruns.

The source node must retain each packet until it receives the corresponding ACK response. If there is no ACK then the Link ERP may have to retransmit the last one or two packets.

To achieve continuous communication at the full bandwidth of the link it is generally necessary for each node to have a pair of transmit buffers and a pair of receive buffers. This provides 'A/B' buffering.

One buffer of each pair is filled/emptied by the link while the other is emptied/filled by the application.

BUFFER MANAGEMENT

The transmit buffers must be carefully managed to allow correct recovery after an error. It may be necessary to retransmit or discard the last one or two packets that were transmitted just before an error. The link hardware must maintain sufficient status to identify the buffers containing these packets and the order in which they were transmitted. If there are N transmit buffers and the transmitter always accesses them in a cyclic sequence then the following two pointers provide sufficient information:

TRANSMIT POINTER This points to the buffer that is to be transmitted next. It is incremented modulo N each time a trailing FLAG is transmitted.

RETRY POINTER This points to the next buffer to be acknowledged. It is incremented modulo N each time an ACK response is received while 'waiting for ACK' is set. Normally it will follow the transmit pointer closely but when an error occurs it may lag by up to 2.

LINK AVAILABILITY

The link hardware in each node can be in one of four availability states:

a) DISABLED. This is the power on state before the link is made operational.

b) ENABLED. This is a transient state on the way to making the link operational.

c) READY. This is the state for normal transmission and reception of packets.

d) CHECK. This state is entered when an error is detected. The link is not operational until the Link ERP success fully returns the hardware to the 'ready' state.

The current state may be inspected and changed by the node processor to determine the state of the link and to enable and disable it. The hardware state may also change automatically when certain events occur.

DISABLED STATE

In this state the transmitter outputs all zeros and the receiver only responds to a Total Reset. The 'disabled' state is entered automatically after a Local Reset is performed or when a packet specifying Total Reset is received in any of the other states. It is also selected explicitly during the Link ERP.

To guarantee recognition by the remote node, the minimum duration of the 'disabled' state is 5 frame periods.

ENABLED STATE

When a node is ready to begin communications the node processor will first check that the line driver and receiver are not indicating a line fault. It can then explicitly change the hardware state to 'enabled'. In this state the transmitter outputs FLAG's and the receiver listens for a FLAG. When a FLAG is detected the link hardware automatically enters the 'ready' state. The node processor may need to poll to detect this transition or the hardware may provide an interrupt.

READY STATE

This is the state for normal communication.

In order to allow the remote node sufficient time to acquire byte synchronisation, when a node first becomes 'ready' it must transmit at least 5 FLAG's before sending any other frames.

When a node first becomes 'ready' the transmitter will send an RR response when at least 1 inbound packet buffer is available. Similarly it will not send any packets until it has received an RR response.

CHECK STATE

This state is entered automatically when the hardware detects an error or it receives a packet specifying Link Reset. The link is then inoperable until the Link ERP successfully returns the hardware to the 'ready' state. The TRANSITION to the 'check' state invokes the Link ERP.

When the hardware enters the 'check' state the transmitter stops sending data packets after completing the current packet, if any. The transmitter then sends FLAG's continuously, except in the following cases:

If the receiver instructs it to send a response.

If the node processor instructs it to send a Link Reset or a Total Reset.

The receiver discards any incoming packets, except if they specify Link Reset or Total Reset. The receiver also discards RR responses but ACK responses are accepted and actioned.

In the 'check' state the application suspends filling the transmit buffers and emptying the receive buffers. This is to avoid transferring a bad received packet to memory.

BEGINNING COMMUNICATION

The link hardware is in the 'disabled' state at power on. When a node processor wishes to begin communications it must take the following steps:

1. Check that the line interface circuits are not indicating a line fault. This would indicate that the remote node is not operational or that the cable is disconnected.

2. Put the link hardware into the 'enabled' state. This will cause the transmitter to start sending FLAG's.

3. When FLAG's are received from the remote node the link hardware will automatically change to the 'ready' state.

4. When an RR response is received from the remote node the transmitter resets 'waiting for RR'.

5. A packet can now be transmitted provided that at least 5 FLAG's have been sent since entering the 'ready' state.

ENDING COMMUNICATION

Since the link has to be quiesced first the method of ending communication must be determined by the application. The following example is only intended to illustrate the steps that are necessary:

1. The node that wants to cease communications waits until the remote node has responded to all of its outstanding requests. It then sends a message requesting to shut down the link.

2. The remote node waits until the local node has responded to all of its out standing requests and then it returns a message acknowledging shut down.

3. Both nodes then disable their link hardware.

PHYSICAL MEDIUM

MODULATION

Data is transmitted as a base band digital signal using the NRZI method. A '1' bit is signalled by inverting the state of the line. For a '0' bit the state of the line is unchanged.

CLOCKING The Serial Link operates synchronously. The receiver must extract a suitable clock from the transitions in the transmitted data.

ENCODING

Synchronous clocking restricts the bit patterns that the transmitter can use since it is undesirable to have long sequences of zeros. Hence an encoding algorithm is required to convert the arbitrary data that one may wish to send into patterns suitable for transmission.

The serial link as described in the present application uses a 4/5 code which guarantees that there will never be more than 3 consecutive zeros in the transmitted data stream.

The transmitter encodes every 4 input data bits into one of the sixteen 5-bit 'data symbols'. The 5 'control symbols' may also be used freely for link control functions. Some of the 11 'restricted symbols' may also be used if care is taken to avoid violating the clocking requirements.

DATA FRAMES

The following conventions are used in this description:

The bits in an unencoded byte are numbered 0 to 7 from left to right.

The bits in an encoded frame are designated a, b, c, d, e, f, g, h, j, k. Bit 'a' is transmitted on the line first.

A 10 bit data frame is constructed by encoding each hexadecimal digit of the data to be transmitted according to the 4/5 code. Bits 0–3 are encoded first, followed by bits 4–7. Thus, '23'x would be encoded as:

Bit: a b c d e f g h j k
'23'x: 1 0 1 0 0 1 0 1 0 1

PROTOCOL FRAMES

Protocol frames are constructed from a combination of 2 symbols, at least one of which is a control symbol. This guarantees that a protocol frame can always be distinguished from a data frame.

Protocol frames that contain 2 control symbols provide added protection against noise on the line. Since control symbols differ from data symbols by at least one bit, such a frame will differ from a data frame by at least 2 bits. The availability of 5 control symbols provides for up to 25 such protocol frames.

Some frames can be constructed from one control and one restricted symbol that still meet the clocking requirement of no more than 3 consecutive zeroes. One such frame is used for the FLAG. This particular frame has been chosen because it does not occur in any phase of all possible combinations of data and control symbols. Therefore it permits the receiver to acquire and verify frame synchronisation. The FLAG frame also contains relatively few transitions to minimise RFI when the link is idle.

Only the following 4 protocol frames are defined:

Bit: a b c d e f g h j k
FLAG: 1 0 0 0 1 0 0 1 0 0
ACK: 0 1 1 0 1 0 1 1 0 1
RR: 1 1 1 1 1 1 1 1 1 1
NUL: 1 1 0 0 1 1 1 0 0 1

ILLEGAL FRAMES: A 10 bit frame results in 1024 possible bit patterns. Since 256 of these patterns are data frames and 4 are protocol frames, this leaves 764 patterns that are undefined. If a node receives any undefined frame while it is in the 'ready' state then it indicates an 'illegal frame' error. The illegal frame '0000000000'B is of special interest. If it is occurs consistently then it indicates that the remote node is in the 'disabled state'. Therefore the receiver provides a 'no frames' indication to allow the Link ERP to detect this condition.

The transmission and receipt of a packet of data will next be described with reference to FIGS. 2, 3 and 5.

FIG. 8 shows the components of one node of FIG. 1 connected via DMA and I/O buses to a microprocessor 10 to which is connected a data buffer 12. The microprocessor contains the logic to address and control the data buffer. The microprocessor also includes a DMA Finite State Machine (FSM) which controls the transfer of data from the Data buffer into the packet buffers of the link hardware. Details of the DMA transfer are not relevant to the present application and are therefore not described. In other systems employing the present invention other means may be provided for transferring data for transmission into the packet buffers. In the described system, all data entering and leaving the link passes through the data buffer. The DMA packet buffers 11 are filled by data which arrives on the links or in the described implementation by DMA which fetches data from the data buffer. The I/O Bus connecting the I/O interface to the microprocessor is used by the microprocessor to access a series of external registers implemented in the link logic. Each of the packet buffers has associated with it a packet status register 14 and a status bit which is set when there is data in the packet buffer waiting to be sent. The function and operation of the packet status register and status bit are described in detail below. The microprocessor can build message packets which are different to the data packets in that they include message information in the data field. The message packets are held in the outbound link message buffer 13 from where they are transmitted in a similar manner to normal data packets. Message packets are used for commands, status and for initiating data transfers.

Figure 2A:
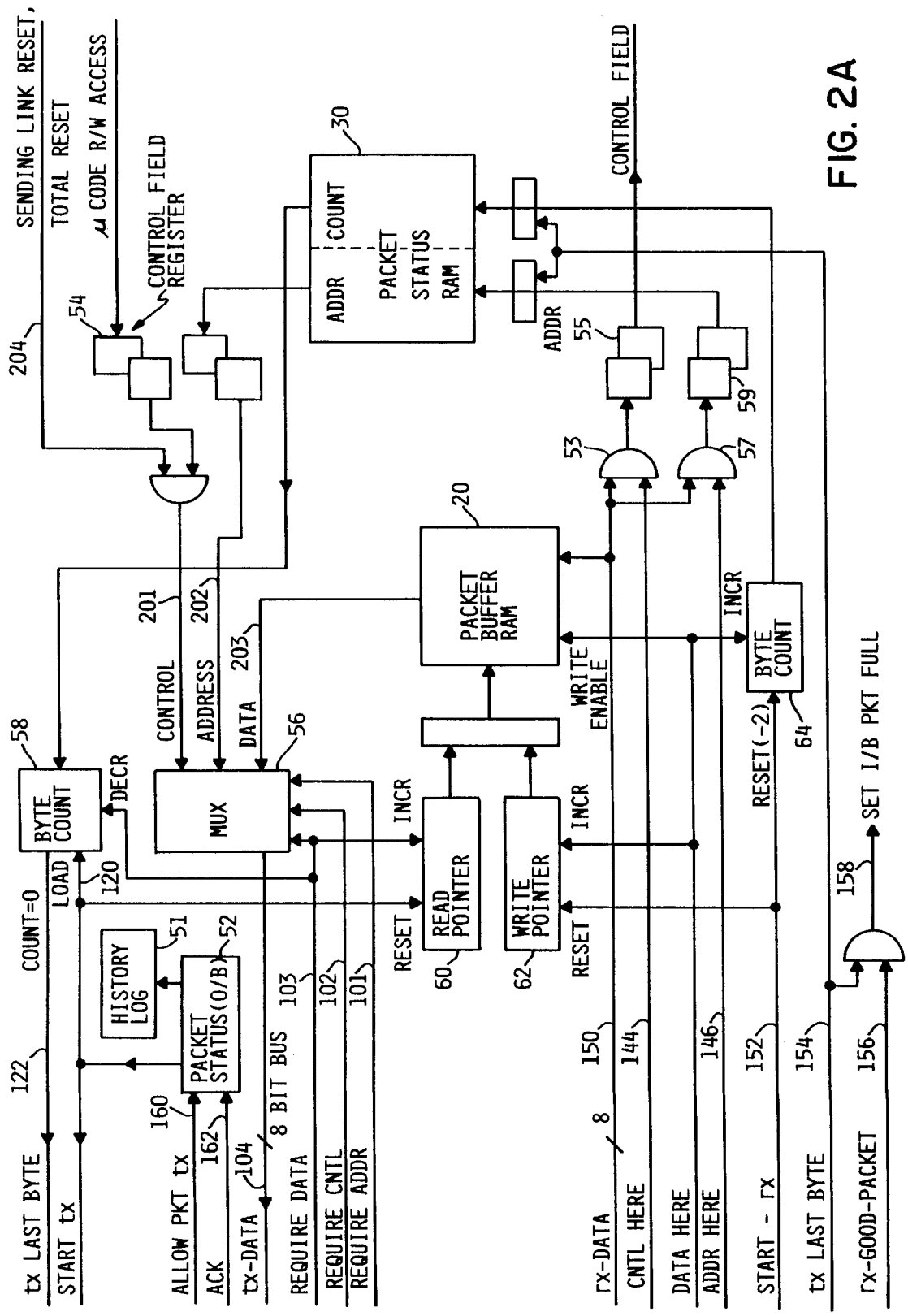
FIGS. 2a and 2b are schematic diagrams showing the components of FIG. 1 in detail.
Figure 2B:
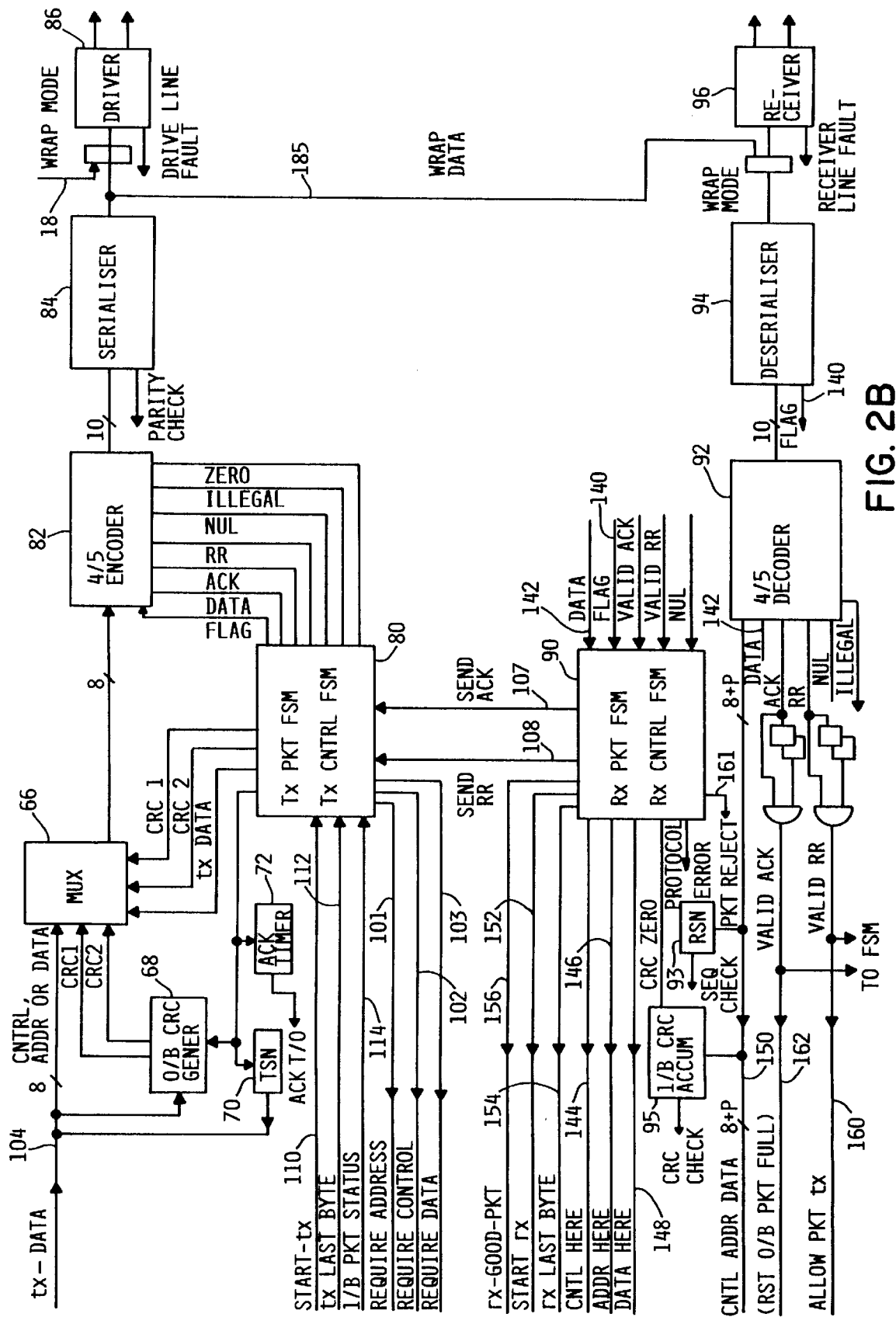

FIGS. 2a and 2b are interconnected with the lines leaving the left hand side of FIG. 2a entering the left hand side of FIG. 2b. FIGS. 2a and b show the main components of the inbound and outbound links with associated packet buffer RAM 20 and packet status RAM 30. The A/B packet buffers for the inbound and outbound links are contained in the packet buffer RAM and the packet status registers associated with each of the A/B buffers are contained in the packet status RAN. The packet status registers keep a count of the number of data bytes stored in the packet buffer and contain address information. Each of the outbound and inbound packet buffers requires a corresponding packet status register (PSR). The packet status registers are 16 bits wide and each contains two fields:

(i) An 8 bit destination field: For outbound packets this contains a value which will be copied into the address field of the outgoing packet when the corresponding packet buffer contents are transmitted by the link. This value may be automatically loaded by hardware when the packet is being fetched into the packet buffer, in preparation for transmission. For inbound packets, this field contains an address extracted from the address field of the incoming packet. This value is written into the PSR by the inbound link FSM, and its value is used to determine the packet's subsequent routing.

(ii) An 8 Bit Byte Count field: For outbound packets this contains a value which indicates the number of bytes which have been placed in the corresponding packet buffer. When the link transmits the packet, this value has to be copied into a byte counter (part of the link hardware) which is decremented as each data byte is sent. The value in the PSR is preserved in case the packet has to be transmitted due to an error during link transmission. For inbound packets, this field contains a value which indicates the number of data bytes which were received in the incoming packet (excluding the two CRC bytes).

Figure 3A:
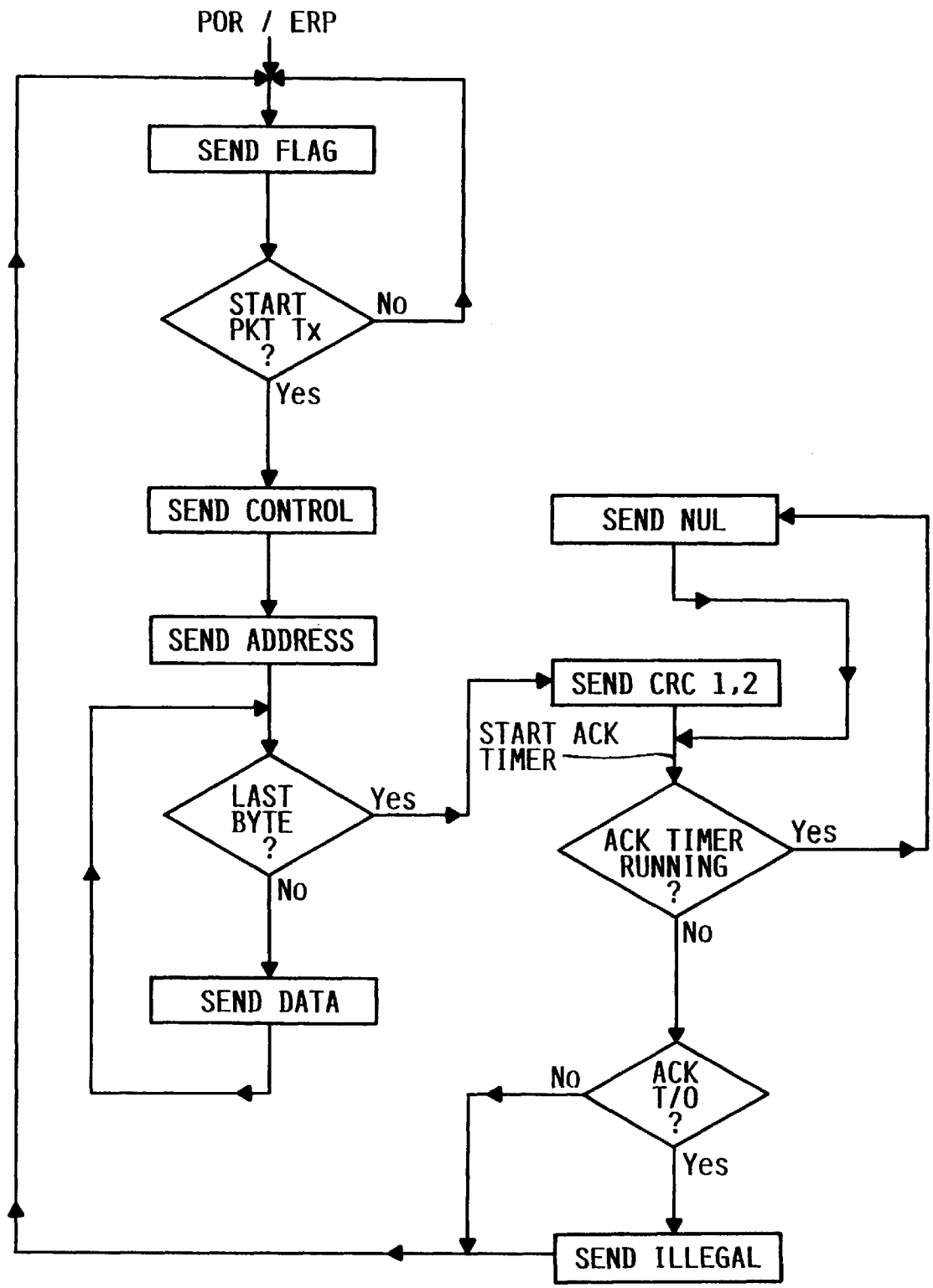
FIGS. 3a and 3b are state diagrams for the transmitter packet and control FSMs as employed in the present invention.
Figure 3B:
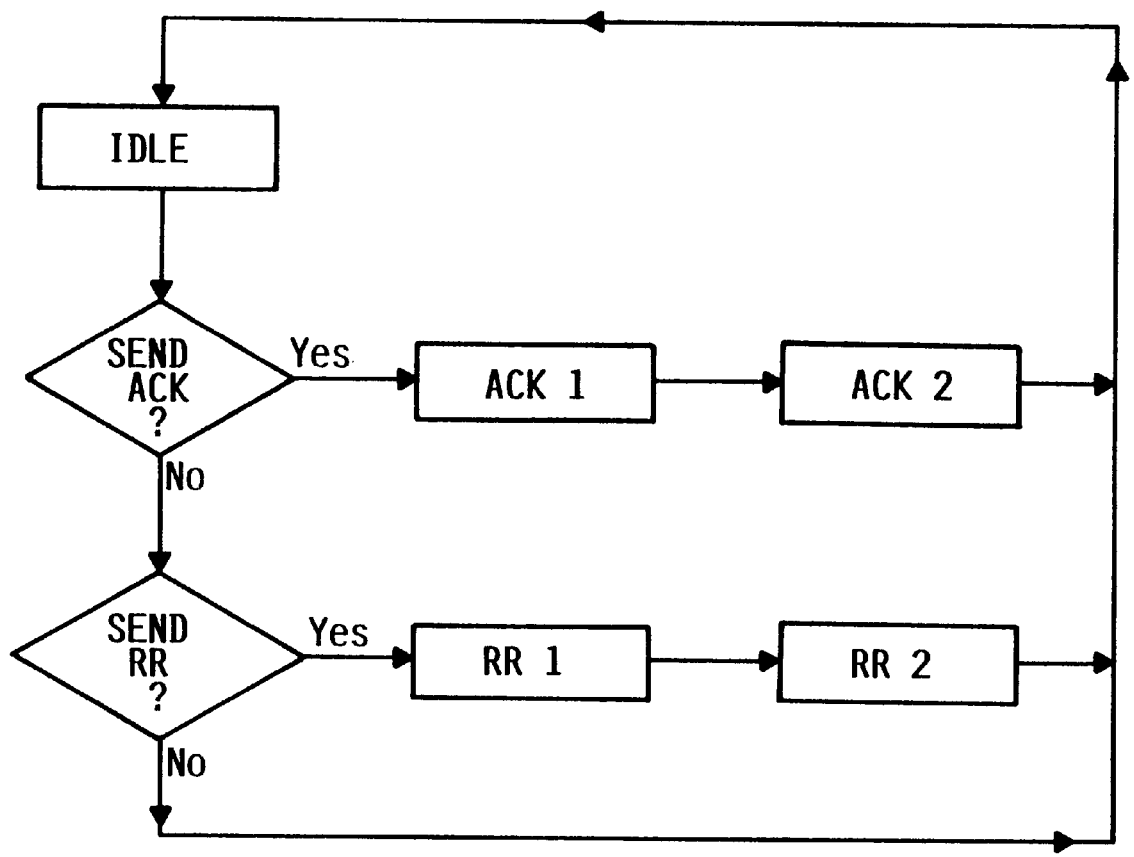

FIGS. 3a and 3b show the various states and the transitions between states of the outbound (Tx) FSMs. There are two FSMs, one being a packet FSM (FIG. 3a) which controls the transmission of packets and the other being a control FSM (FIG. 3b) which controls the transmission of ACK and RR responses. The transmission of a packet of data under the control of the Tx FSM will be described with reference to FIGS. 2a and 2b which show in block diagrammatical form the Tx FSM and connected hardware.

The outbound packet status arbitration logic 52 continuously monitors the outbound packet status bits associated with each packet buffer to determine if there is any data in the buffer which is ready to be transmitted. If so, the Tx packet FSM is notified by a pulse on line 110. At the same time arbitration logic 52 pulses line 120 which causes the byte counter 58 to load the value stored in the 8 bit count field in the packet status register associated with the packet buffer containing the data to be sent. The byte counter therefore contains a value corresponding to the number of data bytes to be transmitted in that particular packet. During packet transmission, the counter is decremented as each byte is transferred from the data packet buffer. A pulse is put onto line 122 when the counter decrements to zero.

When the packet FSM receives the signal over line 110, it sets low the FLAG line between the Tx FSM and the encoder 82 which stops the encoder transmitting FLAG frames. The packet FSM then presents a request for control information on line 101 (FIGS. 2a and b). It will be remembered that the control field of a data packet contains 8 bits. For a normal data packet (ie not link or total reset packet), the first six bits of the control field are set to 0. These 6 bits are obtained from a control field register 54, the signal on 101 causing multiplexer 56 to pass the six bits which are sent out on 104 connecting multiplexer 56 with multiplexer 66. The last two bits of the control byte which contain the packet sequence number information are obtained from TSN register 70 and added to the 6 bits from the control field register. The Transmit sequence number held in the TSN register is incremented for each packet transmitted when the packet FSM enters the 'send control state'.

When the packet FSM enters the 'send address' state, the require address line 101 is pulsed which causes multiplexer 56 to pass the 8 bits of address information contained in the destination field of the associated packet status register. The address information is then passed onto line 104. Because of the exclusive nature of multiplexer 56 only one of the control, address and data lines may be set at any one time and accordingly only control, address or data bytes are present on line 104 at any one time.

The packet FSM then passes from the 'send address state' and checks whether the byte counter is set to zero. If so there is no data to be transmitted in the packet data field and the FSM passes onto the 'send CRC1,2' state. If line 122 does not indicate that byte counter is set to zero then there is data to be transmitted and the FSM enters the 'Send data state'. The require data line 103 which causes the multiplexer to pass a data byte from the packet buffer over lines 203 and 104. Each time a require data signal is sent the byte counter is decremented modulo 4.

A transmitted data packet also contains a CRC field which consists of two data frames. The CRC field is calculated in two 8 bit CRC registers in outbound CRC generator 68. Both registers are preset to all-ones at the start of each packet, more specifically when the Tx packet FSM enters the 'send control' state. The CRC is then accumulated over the control, address and data fields by the registers in the outbound CRC generator 68. When the last byte of data contained in the packet buffer is sent (when the byte counter 58 has decremented to 0) the FSM enters the 'send CRC1,2' state in which the two CRC registers are encoded by the encoder into 10 bit frames (CRC1 and CRC2) and transmitted. When CRC1 and CRC2 have been sent the FSM sets ACK TIMER 72 running. If a pair of ACK frames for a previous data packet have not been received by the inbound link then the FSM sets the NUL line between the FSM and the encoder high thereby causing the encoder to send out NUL frames. When ACK frame is received before an ACK time out occurs, the transmission of NUL frames is stopped and the FSM sets the FLAG line high which causes a FLAG frame, defining the end of the packet, to be sent. The whole packet sending process is repeated if there is more data waiting to be sent, otherwise the FSM causes FLAG frames to be sent continuously.

After the control, address, data and CRC fields have been encoded, the packet passes through serialiser and is transmitted along the outbound twisted pair by driver 86.

At any time during the transmission of a data packet, it may be necessary to send out a pair of response frames either RR or ACK. Transmission of responses has priority over the transmission of the packet so it is necessary to provide the means to interrupt data packet transmission. Sending of ACK or RR responses is controlled by the Tx control FSM which is normally in idle mode while data packets are being transmitted. When the control FSM receives a signal from the Rx FSM over line 107 or 108, the Tx packet FSM is interrupted and the control FSM started. Depending on whether the response required was an ACK or RR, the control FSM sets high the RR or ACK line between the Tx FSM and the encoder which then sends out a pair of 10 bit ACK or RR frames. When this is done, the control FSM reenters the idle state and the packet FSM resumes transmission of the part processed data packet.

Figure 4A:
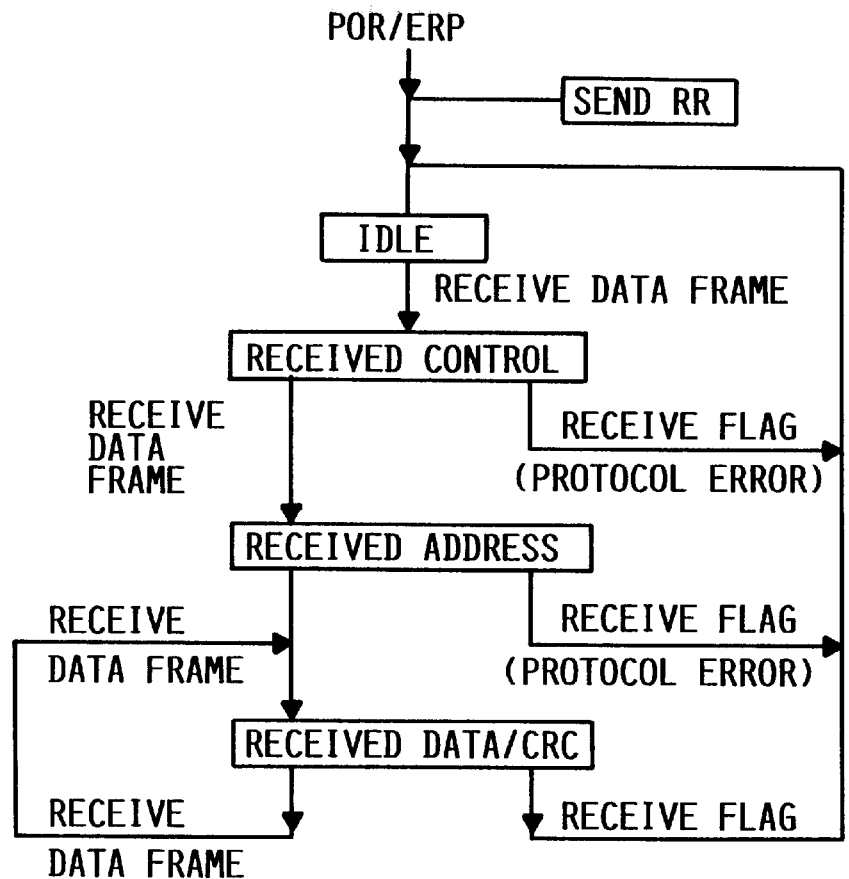
FIGS. 4a and 4b are state diagrams showing the state transitions of the receiver packet and control FSMs as used in one embodiment of the present invention.
Figure 4B:
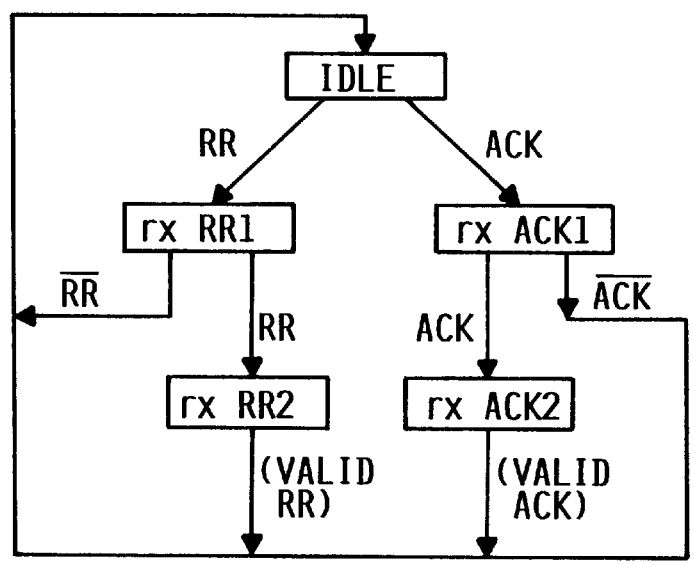

Next will be described the operation of the Rx FSMs in receiving packets of data and response frames (RR and ACK) sent by a transmitter at the other end of the serial link. FIGS. 4a and 4b show the states of the two Rx FSMs (packet and control) and FIGS. 2a and 2b show the FSMs and connected components. Referring to FIG. 4a, the Rx packet FSM is normally sitting in the idle state and receiving pulses along line 140 from deserialiser 94 indicating the receipt of FLAG frames. As noted before FLAG frames are sent continuously when no data packets are sent in order to maintain synchronisation at the receiver. The Rx packet FSM only 'wakes up' when it receives something other than a FLAG frame. When a data frame (ie control, address or data frame) is detected by the inbound 4/5 decoder 92, the data line between the decoder and the Rx packet FSM is pulsed which causes it to enter the 'received control state'. The FSM pulses line 152 which resets byte counter 64. Counter 64 is actually reset at −2, in order to compensate for the two CRC frames expected at the end of the packet. The pulse on line 152 also resets write pointer 62. CRC accumulator is also preset when the FSM enters the received cntrl frame state. The 'cntrl here' line out of the Rx FSM is pulsed. This tells the external logic that the data to be presented on 'rx_data' 8 bit bus is the control frame that has just been received. The control frame is gated by 53 and the information held in register 55 for access by the external logic. After the control frame has been received, normally a second data frame is expected. However, it can happen that the next frame received is a FLAG detected by the deserialiser. This can occur if the control frame that was supposedly received was caused by a glitch on the incoming line. If a FLAG is received, the FSM indicates a protocol error. If the next frame is a data frame the data line between decoder and FSM is pulsed once again which causes the FSM to enter the 'received address' frame state. The FSM then pulses the 'addr here' line 146. This tells logic outside the link that the data on 8 bit bus 150 is an address frame. The address frame is gated by 57 and the byte making up the address frame is held temporarily in register 59. The external logic looks at the address and decides whether the address is valid. If not a packet reject error is indicated.

After the address byte has been received, the next frame will be either a data byte or a CRC byte, depending on whether there is a data field in the packet. The FSM enters the 'received data/crc state'. At this stage data and CRC frames are indistinguishable from one another. The FSM pulses line 148 indicating the presence of a data frame. Byte counter and write pointer are incremented and the data frame is transferred into the packet buffer. As data frames are received, the packet FSM goes round the receive data frame loop, each time a frame is received the byte counter and write pointer are incremented. As each frame is received (including control and address frames) inbound CRC accumulator 95 accumulates CRC over the incoming frames. When all data frames have been received, a FLAG is detected by the deserialiser. This causes the Rx FSM to reenter the idle state until the next data packet begins to come in. When the 'received data' state of the FSM is exited on receipt of the end FLAG, the FSM pulses lines 154 indicating the last byte has been received. In addition if the packet has been received without protocol, CRC or other errors then the FSM pulses line 156. If no errors have been detected and the CRC checksum is correct, then the Rx FSM pulses line 107 which freezes the Tx packet FSM if in the middle of transmitting a packet and causes the Tx control FSM to send out a pair of ACK frames as described above. The RSN in register is also incremented. When 154 and 156 are pulsed, the count stored in byte counter 64 is copied into the packet status register associated with the packet buffer into which the data has been written. The address held in register 59 is also copied in the destination field of the status register. After the address and count fields of the register have been written the i/b packet full bit is set by a pulse on line 158 which indicates to the external logic (ie the logic that uses the data that has been received) that a packet has been correctly received and is ready for access. If during receipt of a packet, an illegal frame is detected by the decoder, the portion of the packet received up to that point is discarded.

As described previously during full duplex operation of the link a response frame (RR or ACK) may be interleaved within a data packet. Accordingly when a packet is being received as described above, the decoder may detect a pair of ACK or RR frames. The Rx control FSM which is normally idling is started. When a RR frame is detected, the control FSM enters the 'rx RR1' state. If a second RR frame is detected (as should be the case) the FSM enters the 'Rx RR2' state. The FSM then indicates that a valid RR response has been received and this causes line 160 to be pulsed thereby indicating to the packet arbitration logic 52 that the remote node is ready to receive more data. The arbitration logic knows if there is data in the buffer to be transmitted and if so it begins packet transmission as described above. If the Rx control FSM receives a pair of ACK frames, then it causes line 162 to be pulsed. The arbitration logic indicates to the history log that a valid ACK response has been received. The history log knows what packets are outstanding that require acknowledgment. The Tx packet buffer containing the acknowledged packet can then be cleared ready for more data.

Independently of the link availability states described earlier, a node is able to operate its link hardware in the 'wrap' mode. This is useful to perform a power on self test (POST) of the local hardware. In the 'wrap' mode the transmitter output is internally connected to the receiver input. In FIG. 2a, the line between driver and serialiser and driver on the outbound side is connectable to the line between receiver and deserialiser on the inbound side. A pulse from external logic on line 18 connects the two sides. Test data packets are generated by microcode and placed in the microprocessor message buffer under the control of the microprocessor. The presence of a packet in the message buffer is detected by the hardware and is transmitted along line 185 where it is received and processed by the inbound link in the normal manner. As usual the inbound link will cause the outbound hardware to transmit an ACK response if the packet has been received correctly. This ACK response passes along line 185 where it is received by the inbound hardware. In this way the functions of the node can be checked for example at power on in order to ensure error free operation before packet transmission is begun in earnest ie, the link hardware can be fully tested without needing a remote node. In addition, using this 'wrap mode' the link hardware is tested as a complete unit thereby avoiding the necessity of testing individual sections of logic.

TABLE 1

| | |
|---|---|
| APPLICATION | A software process that is communicating via the link. |
| NODE | One of the two ends of a serial link. |
| SOURCE | The node that originates a particular packet. |
| DESTINATION | The node that receives the packet. |
| LINE | A physical connection between a transmitter and a receiver. |
| TRANSMITTER, TX | The logic that drives the out-bound line. |
| RECEIVER, RX | The logic that decodes the signal on the in-bound line. |
| FRAME | A sequence of 10 encoded bits that represents a data byte or a protocol function. |
| PACKET | A sequence of 4 or more data frames delimited by FLAG frames. |
| FIELD | A group of related data frames in a packet, eg. the CRC field. |
| RESPONSE | A pair of ACK or RR frames that is sent in reply to a received packet. |
| CRC | Cyclic redundancy check |
| ERP | Error recovery procedure |
| FSM | Finite state machine |
| NRZI | Non return to zero inverted |
| POR | Power on reset |
| POST | Power on self test |
| RFI | Radio frequency interference |
| LINK STATUS BYTE | A byte of status information which is exchanged between nodes during execution of the link ERP. |

We claim:

1. A method of communicating between first and second nodes connected by a serial link, the method comprising the steps of;

transmitting data between said nodes in the form of packets, each packet comprising a plurality of predefined fields, each field consisting of one or more multibit data frames; and controlling the flow of the data packets by means of multiple bit control frames having the same bit length as the data frames and being distinguishable from the data frames, the control frames being transmissible independently of the data packets.

2. A method as claimed in claim 1, wherein said transmitting data step comprises full duplex data transmission between said first and second nodes in which packets of data are transmitted from the second node to the first node, and wherein the control frames may be interleaved between the frames making up the data packets.

3. A method as claimed in claim 1 wherein one type of control frame is an acknowledgement frame which is sent by the second node to the first node upon receipt of a packet of data sent by the first node to the second node, the method further comprising the step of:

transmitting first and second packets of data from the first node to the second node, wherein transmission of the second data packet cannot be completed before an acknowledgement signal associated with the first packet is received by the first node from the second node.

4. A method as claimed in claim 3 wherein the data packets are delimited by predefined flag frames and whereby the end flag frame of the second packet is not transmitted until the first node has received the first packet acknowledgement frame from the second node.

5. A method as claimed in claim 4 wherein predefined control frames (NUL) are included in the second data packet until the first packet acknowledgement frame is received, after which the end flag delimiter is transmitted to complete transmission of the second data packet.

6. A method as claimed in claim 3 wherein a data packet is constructed from data stored in a buffer in the first node and wherein the data is held in the buffer until such time as an acknowledgement frame for that packet has been received by the first node, after which receipt the buffer may be cleared ready for the storage of new data.

7. A method as claimed in claim 1 wherein the control frames are transmitted in pairs.

8. A method as claimed in claim 1 wherein first and second nodes indicate readiness to receive data from second and first nodes respectively by means of a second type of control frame (RR) whereby when the second node is ready to receive data from the first node, an RR frame is sent from the second to the first node to indicate said readiness.

9. A data communication system comprising a first node connected to a second node by means of a serial link means in the first node for transmitting data over the serial link to the second node, the data being in the form of packets comprising a plurality of predefined fields, each field consisting of one or more multibit data frames, and means for controlling the flow of data between the nodes employing multiple bit control frames having the same bit length as the data frames and being distinguishable from the data frames, said control frames being transmissible independently of the data packets.

10. A system as claimed in claim 9, one type of control frame being an acknowledgement frame and the second node including means for transmitting packets of data over the serial link and means responsive to the receipt of a data packet from the first node to send an acknowledgement frame to the first node, wherein the acknowledgement frame may be interleaved between the data frames of a packet being transmitted from the second to the first node.

11. A system as claimed in claim 10, wherein the transmitting means in the first node transmits first and second packets of data to the second node and the responsive means in the second node sends an acknowledgement frame to the first node on receipt of said first data packet, the first node including means responsive to the receipt of said acknowledgment frame to cause the first node transmitting means to complete the transmission of said second packet of data to the second node.

12. A system as claimed in claim 11, the first node further including a transmit data buffer in which data making up the first and second packets is stored and wherein the data making up the first packet is held in the transmit buffer until the acknowledgement frame, indicating correct receipt by the second node of the first data packet, is received by the first node.

\* \* \* \* \*